May 23, 1950     E. M. SMITH     2,509,046

TEMPERATURE RESPONSIVE MEASURING APPARATUS

Filed Oct. 13, 1944

*INVENTOR.*
EDGAR M. SMITH

BY *E. B. Spangenberg*
ATTORNEY.

Patented May 23, 1950

2,509,046

UNITED STATES PATENT OFFICE 2,509,046

TEMPERATURE RESPONSIVE MEASURING APPARATUS

Edgar M. Smith, Trenton, N. J., assignor, by mesne assignments, to Minneapolis-Honeywell Regulator Company, Minneapolis, Minn., a corporation of Delaware Application October 13, 1944, Serial No. 558,515

3 Claims. (Cl. 73—341)

The present invention relates to potentiometric measuring apparatus including simple and effective means for effecting its adjustment into different operative conditions, under which it is adapted to measure voltages of different sources of voltages in respectively different value ranges, in such manner as to effect a suppression scale difference between the measurements of the voltages of the different sources in the different value ranges. The term "scale suppression" is used herein with a meaning well known to the art. For example, if a measuring instrument used in measuring the temperature of a thermocouple has its exhibiting element at the low end of its deflecting range for a thermocouple temperature of 500° in one operative condition, and is then adjusted into a second operative position in which the same position of the element corresponds to a thermocouple temperature of 1000°, the adjustment produces a "scale suppression" effect of 500°.

The present invention comprises improvements in the apparatus of the above mentioned character, disclosed and claimed in my prior copending application Serial No. 490,589, filed June 12, 1943, and in the Patent 2,364,923 granted December 12, 1944, on said prior application. The apparatus illustrated and described in said prior application comprises a self-balancing potentiometric unit including a pen carriage or other exhibiting element deflecting in accordance with the values of the quantities measured. Such a unit may be termed a multiple range potentiometer, as the relation between the deflective position of the exhibiting element and the value of the quantity measured is different in different range adjustments of the unit. However, the purpose of each such adjustment is to produce, or to eliminate, a scale suppression effect, and not to vary the ratio of the change in the position of the element to the coresponding change in the value of the quantity measured.

A major object of the present invention is to provide potentiometric measuring apparatus of the character disclosed in the above-mentioned patent with simple and effective means for automatically effecting cold junction temperature compensation in measuring, with a suppression scale range difference, the voltages of the thermocouples formed of different materials and requiring different corrective effects to compensate for variations in their cold junction temperatures.

A further major object of the present invention is to provide apparatus of the above mentioned type including my improved cold junction temperature compensating means with simple means for recalibrating the potentiometric measuring circuit as required to compensate for variations in the voltage of the energizing battery of the circuit.

A more specific object of the present invention is to provide potentiometric measuring apparatus with which the above mentioned primary objects of the present invention are obtainable, which does not differ from apparatus disclosed in the above-mentioned patent except in respect to the arrangement and character of the resistance sections included in the resistance section of the split potentiometer or bridge circuit of said apparatus.

As is well known in the art, the voltage of a thermocouple is a function of the difference between the hot and cold junction temperatures of the thermocouple. Ordinarily, the voltage of a thermocouple is measured for the ultimate purpose of determining the temperature of the hot junction of the thermocouple. Cold junction temperature compensation is customarily effected in a potentiometer bridge circuit, by including in series in one branch of the circuit, a certain amount of resistance having a zero temperature coefficient and a certain amount of resistance having a positive temperature coefficient. To obtain accurate compensation in such manner, it is essential that the resistance having a zero temperature coefficient and the resistance having a positive temperature coefficient, should be proportioned in suitable accordance with thermocouple characteristics which depend largely upon the materials of which the thermocouple is made. Thus, for example, an Iron Constantan thermocouple, a Platinum Rhodium thermocouple, and a Chromel Alumel thermocouple require definitely different corrective effects to compensate for normal variations in their respective cold junction temperatures.

Temperature compensation in a multiple range potentiometer is of especial practical importance in uses, such as are herein contemplated, in which thermocouples formed of different materials and having definitely different characteristics are alternately connected into the potentiometric circuit network.

For example, in one contemplated use of the invention in the glass industry, one thermocouple is an Iron Constantan thermocouple subjected to temperatures varying from zero to 700° F., while the other thermocouple is a Platinum Rhodium thermocouple subjected to temperatures as high as 3000° F. That thermocouple at 3000° F. will have about the same voltage as the Iron Constantan thermocouple at a temperature of 700° F.

In another contemplated use of the invention, an Iron Constantan thermocouple and a Chromel Alumel thermocouple are subject to maximum temperatures of 1500° F. and 2000° F. respectively, and at those temperatures the voltages of the Iron Constantan and the Chromel Alumel thermocouples are about the same. Those thermocouples also have about the same voltages when the Iron Constantan thermocouple temperature is 1000° F., and the Chromel Alumel thermocouple temperature is about 1300° F.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described preferred embodiments of the invention.

Figure 1:
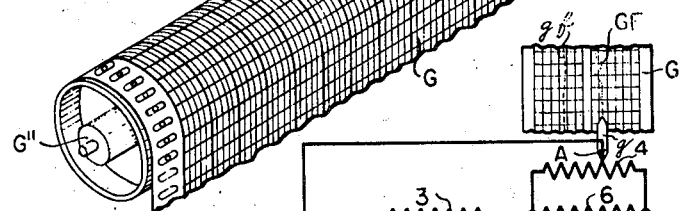
Fig. 1 is a diagram illustrating a potentiometric measuring circuit network and recording means.

The potentiometric measuring circuit network shown diagrammatically in Fig. 1 includes a split potentiometer or bridge, a measuring branch, and a calibrating branch. The split potentiometer comprises an energizing branch, a slide wire resistance branch and a second resistance branch, the two resistance branches being connected in parallel with each other and in series with the energizing branch. The energizing branch includes a circuit energizing source of current 1 and an adjustable resistance 2. The slide wire resistance branch, in the form shown, comprises resistors 3, 4 and 5 connected in series with one another, and a resistance 6 connected in parallel with the resistor 4. The latter constitutes the slide wire resistance element of the network and is engaged by a slider or movable contact A adjustable along the length of the resistor 4. The second resistance branch of the split potentiometer includes resistance sections or resistors 7, 8, 8a, 9, 10 and 10a connected in series in the order stated between the positive and negative ends of the energizing branch of the circuit.

In its closed or operable condition, the measuring branch of the circuit network shown in Fig. 1 comprises a conductor 11, a commutating or selector switch B, one or the other of the thermocouples F and f, depending upon the adjustment of the switch B, a conductor 12, a standardizing switch C, a galvanometer D, and a range shifting switch E. As diagrammatically shown, the selector switch B comprises contacts or blades 13 and 14 connected to the conductors 11 and 12, respectively, and comprises a pair of cooperating contacts 15 and 16 and a second pair of cooperating contacts 17 and 18. The contacts 15 and 16 are connected to the thermocouple F, and the contacts 17 and 18 are connected to the terminals of the thermocouple f.

As diagrammatically shown, the switch B includes contacts 13' and 14' adjustable into one position in which they connect the terminals 15 and 16 of thermocouple F to the blades 13 and 14, and thereby to the conductors 11 and 12. The contacts 13' and 14' are also adjustable into a second position in which they connect the terminals of the thermocouple f to the blades 13 and 14 and thereby to the conductors 11 and 12. The contacts 15 and 16 are connected to, and disconnected from the contacts 13 and 14 when the contacts 17 and 18 are respectively disconnected from and connected to the contacts 13 and 14.

In the closed condition of the measuring branch of the network, the standardizing switch C is in the position in which it engages a switch contact C' which is connected by the conductor 12 to the switch contact 14. The galvanometer D has one terminal connected to the switch C and normally has its second terminal connected either to the positive terminal of the resistor 8 or the negative terminal of the resistor 8a, accordingly as the adjustment of the range shifting switch E is such that it engages one or the other of switch contacts E' and E², the contact E' being connected to the positive terminal of the resistor 8, and the contact E² being connected to the negative terminal of the resistor 8a. The resistors 8 and 8a may be referred to as scale suppression resistors, since when the switch engages the contact E', the measurements effected are in a different range from that including the measurements effected when the switch E engages the contact E².

In the closed condition of the calibration branch of the network shown in Fig. 1, the standardizing switch C is in the position in which it engages the contact C². Said branch comprises the switch E, the galvanometer D, the switch C, the switch contact C², a standard cell Sc, a resistance 19, and a calibration range switch e. The latter is normally in engagement with a contact e' connected to the positive terminal of the resistor 10, or in engagement with a contact e² connected to the negative terminal of the resistor 10a, accordingly as the switch E engages the contact E' or contact E², respectively. To this end, the switches E and e may be mechanically interconnected as by means of an element Ee. In practice, also, the switch E and contacts 13' and 14' of switch B may be mechanically connected by an element BE, so that when the thermocouple f is connected in the measuring branch of the circuit, the switch E will engage the contact E', and so that when the switch E engages the contact E² the thermocouple F will be connected in said measuring branch.

On the assumption that the thermocouples F and f have the polarities indicated in Fig. 1 and are subjected to similar temperatures and generate the same E. M. F. when similarly heated, the position of the contact A along the slide wire resistance 4 at which the potentiometer will be balanced when the switches B and E are adjusted to connect the thermocouple F and the switch contact E² into the measuring circuit, will be to the right of the position at which potentiometer balance is established when the thermocouple f replaces the thermocouple F in the measuring circuit and the switch E engages the contact E'. This results from the fact that the potential of the switch contact E' is higher than that of the contact E². In consequence, under conditions in which the same E. M. F is developed by each thermocouple, the potential of each terminal of the thermocouple F when connected in the measuring circuit is lower than the potential of the corresponding terminal of the thermocouple f when the latter is connected in the measuring circuit.

In Fig. 1, record lines are made on a traveling record chart strip G by a pen, print wheel, or other marking element g adjusted in proportion to the adjustment of the contact A along the slide wire resistance 4. As diagrammatically shown in Fig. 1, the recording element g and the contact A are mechanically connected so that they have similar movements longitudinally of the resistance 4. However, the marking element g and slide wire contact A may be relatively movable and be given proportional movements as are the slide wire contact AA and pen GA of the well known commercial type of instrument shown in Fig. 2, and more fully disclosed in various prior patents including Patent 2,150,502 of March 14, 1939.

On the chart G shown in Fig. 1, the line GF is a record of the voltage of the thermocouple F, and the line gf is a record of the voltage of the thermocouple f. As shown, the said lines are consistent with the assumptions that the voltages of the thermocouples F and f vary similarly and are equal at all times, and that the lateral displacement of the two record lines on the chart G is wholly due to the suppression scale difference between the measurements of the two thermocouple voltages. Stated differently, the lateral displacement of the two record lines GF and gf is due to the fact that when the voltage of the thermocouple f is being measured, the scale suppression resistors 8 and 8a produce a measuring scale suppression action which is not produced in the measurement of the voltage of the thermocouple F.

While it is obviously possible to manually adjust the switches B and E to alternately measure and record the temperature of the thermocouples F and f as just described, in practice mechanism may well be provided for automatically adjusting the commutating switch B, and thereby the mechanically connected switch E, so as to successively measure the temperatures of the thermocouples F and f at regular intervals. The use of such mechanism in a "Brown potentiometer" which measures a plurality of the thermocouple temperatures successively at regular intervals is shown in the above mentioned Patent 2,150,502.

Figure 2:
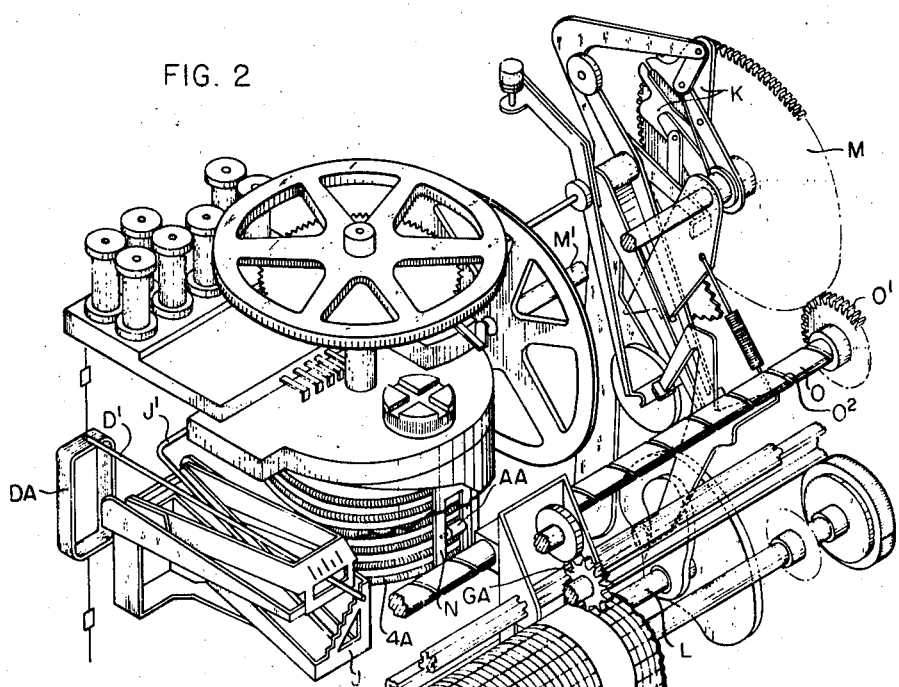
Fig. 2 is a perspective view diagrammatically illustrating a portion of a potentiometric instrument adapted for use in connection with the circuit network and recording means diagrammatically shown in Fig. 1.

In so far as above described, the apparatus illustrated in Figs. 1 and 2 does not differ from apparatus disclosed in my previously mentioned prior application, except that in the prior application the resistance branch of the split potentiometer does not include resistors corresponding to the resistors 8a and 10a of Fig. 1, although it does include resistors corresponding to the resistor sections 7, 8, 9 and 10 of that figure.

In accordance with the present invention, the resistors 7, 8a and 10a of Fig. 1 may be formed of material, such as nickel, having a suitable positive temperature coefficient. The remaining resistors 8, 9 and 10 are preferably each formed of material having a zero temperature coefficient.

In the arrangement shown in Fig. 1, the thermocouple f requires less cold junction temperature compensation than does the thermocouple F. In consequence, the thermocouple f is the thermocouple operatively connected into the potentiometer network by the switch E when the latter engages switch contact E', and resistance section 7 should be so chosen as to have a resistance value and a proper temperature coefficient in relation to the aggregate resistance of the resistors or resistance sections 7, 8, 8a, 9, 10 and 10a, to provide the cold junction temperature compensation needed for the thermocouple f. When the switch E engages the contact E² and operatively connects the thermocouple F into the potentiometric network, the sum of the resistance of sections 7, 8 and 8a should be so chosen as to have an aggregate resistance value and the proper temperature coefficient relation to the aggregate resistance of the sections 7, 8, 8a, 9, 10 and 10a to provide the cold junction temperature compensation needed for the thermocouple F. The magnitudes of the various resistance sections 7, 8, 8a, 9, 10 and 10a suitable for the cold junction compensation purposes of the present invention, may be determined by the use of principles of design and formulae which are well known and are commonly used in providing the cold junction temperature compensation required in a single range potentiometer, and hence need not be further described or explained herein.

For the purposes of cold junction temperature compensation, the relative magnitudes of the resistance sections 9, 10 and 10a is of no consequence. For the recalibration purposes which may be effected with the Fig. 1 arrangement, however, it is essential that the magnitudes of each of the resistance sections 9, 10 and 10a should be properly proportioned relatively to one another and to the magnitudes of the resistance sections 7, 8 and 8a as follows:

The resistances 8 and 10 should be equal in magnitude; the resistances 8a and 10a should be equal in magnitude; and the sum of the resistances 8, 8a and 9 should be equal to the sum of the resistances 9, 10 and 10a.

With the arrangement shown in Fig. 1 and the resistance values just stated, calibration practically satisfactory for most conditions of use is obtainable. The fact that the resistance of the resistance sections 8a and 10a vary with changes in the ambient temperature, prevents the calibration from being wholly accurate when the ambient temperature is subject to change. In many cases, however, the calibration error due to ambient temperature change can be kept within acceptably small limits, by making the change in the relative resistances of resistors 8a and 10a due to ambient temperature changes, suitably small in comparison with the sum of the resistances of resistors 8, 8a and 9, and the equivalent sum of the resistances of resistors 9, 10 and 10a.

Figure 3:
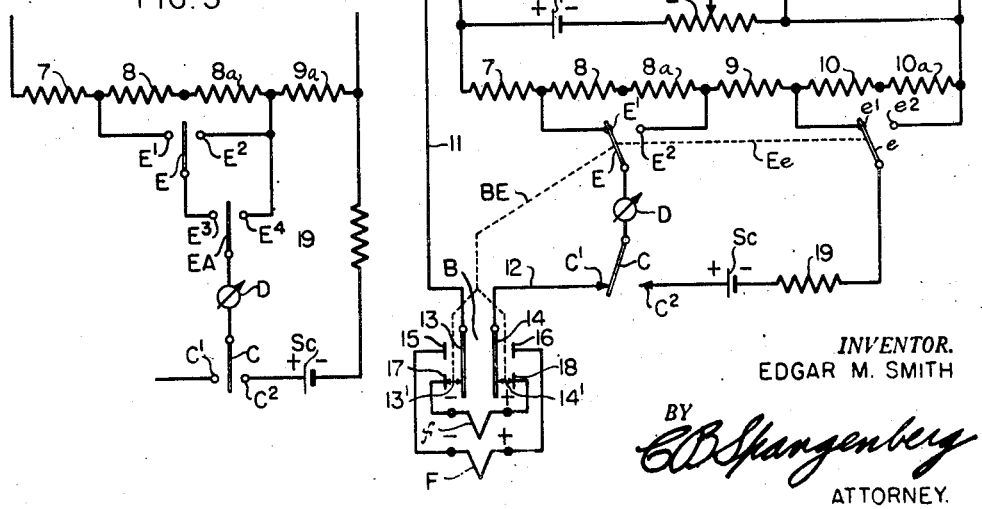
Fig. 3 is a diagram illustrating a modification of a portion of the apparatus shown diagrammatically in Fig. 1.

It is possible to avoid significant recalibration errors caused by ambient temperature changes in the resistances of the resistors which are included in the resistance branch and have positive temperature coefficients, by making use of the modified circuit arrangement shown in Fig. 3. That arrangement differs essentially from the arrangement shown in Fig. 1, in that it omits the switch e of Fig. 1, and in that it includes a switch EA which is in series with the galvanometer D and switch C, and is adjustable between one position in which it engages a stationary contact E³ and a second position in which it engages a contact E⁴. In the measuring condition of the apparatus, the switch EA engages the contact E³ and thereby connects the switch E in series with the galvanometer D and switch C, and the latter engages the stationary contact C'. In the recalibration condition of the apparatus, the switch EA engages the contact E⁴, and the switch EA and galvanometer D are then connected in series between the negative terminal of the resistance 8a and the switch C, and the switch C then engages the contact C².

In the Fig. 3 arrangement, the resistance branch of the potentiometer bridge circuit differs from the corresponding circuit branch of Fig. 1 in that the separate resistors 9, 10 and 10a of Fig. 1 are replaced in Fig. 3 by a single resistor 9a having a zero temperature coefficient and having a resistance which may be approximately equal to the sum of the resistances of the resistors 9, 10 and 10a at the average ambient temperature. If the resistance of 9a is large as it should be in comparison with the sum of the resistances of the resistors 7, 8 and 8a, the accuracy of the calibration will not be affected by the small changes in the small resistances 7 and 8a due to the usual changes in the ambient temperature.

While, in accordance with the provisions of the statutes, I have illustrated and described the best forms of embodiment of my invention now known to me, it will be apparent to those skilled in the art that changes may be made in the forms of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A potentiometric measuring circuit for measuring the voltages of two thermocouples differing so that similar variations in their cold junction temperatures produce a greater difference in the voltage of one thermocouple than in the voltage of the second thermocouple, with scale suppression and cold junction temperature compensation differences between the measurements, said circuit including a slide wire resistance, a resistor having a resistance which varies with its temperature, and resistance material in series with said resistor and varying in resistance with its temperature, a source of current and an adjustable resistance included in said circuit and creating regulable current flows through said slide wire resistance and through said resistor and resistance material, a contact adjustable along said slide wire resistance, a current responsive device, two thermocouples and means for connecting said thermocouples one at a time in said circuit in series with said device between said contact and said resistance material, said one thermocouple being connectable to said resistance material at the end of the latter remote from said resistor, so that the voltage of said one thermocouple and said current source tend to produce current flows in opposite directions through said resistance material and resistor, and said second thermocouple being connectable to said resistance material at the end of the latter adjacent said resistor so that said second thermocouple and said current source tend to produce current flows in opposite directions through said resistor, the variations in resistance of said resistor and resistance material due to ambient temperature changes being so related to the changes in the voltages of said thermocouples produced by their respective cold junction temperature changes resulting from said ambient temperature changes as to compensate for variations in the cold junction temperature of each thermocouple when that thermocouple is connected in said measuring circuit.

2. A potentiometric measuring circuit as specified in claim 1, including additional resistance in series with said resistor and resistance material, and including calibrating means comprising a standard cell and means for operatively disconnecting said current responsive device from said thermocouples and for operatively connecting said device and said cell in series with one another between the terminals of said additional resistance.

3. A potentiometric measuring circuit for measuring the voltages of two thermocouples differing so that similar variations in their cold junction temperatures produce a greater difference in the voltage of one thermocouple than in the voltage of the second thermocouple, with scale suppression and cold junction temperature compensation differences between the measurements, said circuit comprising an energizing branch including a source of current, a second branch including a slide wire resistance and a third branch including first, second and third resistance elements, said elements being connected in series with one another with said second element intermediate said first and third elements, each of said second and third circuit branches being connected in parallel with the other and in series with said energizing branch, a contact adjustable along said slide wire resistance, a current responsive device and means including a switch mechanism adjustable between two operative conditions, in one of which it connects one of said thermocouples in series with said device between said contact and said third circuit branch at one end of said second resistance, and in the other of which it connects the second of said thermocouples in series with said device between said contact and said third circuit branch at the second end of said resistance element, said first and second resistance elements varying in resistance in response to ambient temperature changes in amount so related to the variations in voltages of the two thermocouples resulting from variations in their respective cold junction temperature due to the said ambient temperature changes, as to compensate for the effect of said ambient temperature on the voltage of each of said thermocouples when connected in said measuring circuit.

EDGAR M. SMITH.

REFERENCES CITED

The following references are of record in the file of this patent:

UNITED STATES PATENTS

| Number | Name | Date |
|---|---|---|
| 1,443,553 | Allcutt | Jan. 30, 1923 |
| 1,982,053 | Hodgson et al. | Nov. 27, 1934 |
| 2,344,116 | Ullman | Mar. 14, 1944 |
| 2,364,923 | Smith | Dec. 12, 1944 |